(12) United States Patent
Stamps et al.

(10) Patent No.: US 6,431,530 B1
(45) Date of Patent: Aug. 13, 2002

(54) VERTICAL LIQUID INERTIA VIBRATION ISOLATOR

(75) Inventors: Frank Bradley Stamps; Michael Reaugh Smith; James Lee Braswell, Jr., all of Colleyville; Timothy Kent Ledbetter, Euless, all of TX (US)

(73) Assignee: Bell Helicopter Textron, Inc., Hurst, TX (US)

( * ) Notice: Subject to any disclaimer, the term of this patent is extended or adjusted under 35 U.S.C. 154(b) by 0 days.

(21) Appl. No.: 09/577,737

(22) Filed: May 23, 2000

(51) Int. Cl.[7] .................................................. F16F 9/04
(52) U.S. Cl. ....................... 267/136; 267/141.3; 267/293
(58) Field of Search ............................ 267/136, 140.11, 267/140.13, 141.1–141.7, 293; 188/298, 378, 379, 380; 244/54; 248/562, 636, 638

(56) References Cited

U.S. PATENT DOCUMENTS

| | | | |
|---|---|---|---|
| 3,769,672 A | 11/1973 | Eklund | 29/149.5 |
| 3,777,672 A | 12/1973 | Schneider | 105/453 |
| 3,782,854 A | 1/1974 | Rybicki | 416/134 |
| 4,236,607 A | 12/1980 | Halwes et al. | 188/1 B |
| 4,651,980 A | 3/1987 | Morita et al. | 267/140.1 |
| 4,739,962 A | 4/1988 | Morita et al. | 248/562 |
| 4,811,919 A * | 3/1989 | Jones | 244/54 |
| 5,174,552 A | 12/1992 | Hodgson et al. | 267/140.11 |
| 5,312,093 A | 5/1994 | Smith et al. | 267/140.11 |
| 5,374,039 A | 12/1994 | Schmidt et al. | 267/140.13 |
| 5,435,531 A | 7/1995 | Smith et al. | 267/140.11 |
| 5,439,082 A | 8/1995 | McKeown et al. | 188/379 |
| 5,439,204 A | 8/1995 | Yamazoe et al. | 267/140 |
| 5,540,549 A | 7/1996 | McGuire | 416/140 |
| 5,779,231 A | 7/1998 | Okazaki et al. | 267/140.14 |
| 5,788,029 A | 8/1998 | Smith et al. | 188/267.14 |
| 5,788,372 A | 8/1998 | Jones et al. | 267/136 |
| 6,009,983 A * | 1/2000 | Stamps et al. | 188/298 |
| 6,131,709 A * | 10/2000 | Jolly et al. | 188/267.2 |
| 6,217,011 B1 * | 4/2001 | Redinger | 267/140.11 |

FOREIGN PATENT DOCUMENTS

| | | | |
|---|---|---|---|
| FR | 92 08592 | 7/1992 | G01L/11/00 |
| FR | 95 04221 | 4/1995 | F16F/9/18 |
| WO | WO 98/54486 | 12/1998 | F16F/9/04 |
| WO | WO 99/06733 | 2/1999 | F16F/13/24 |

* cited by examiner

Primary Examiner—Christopher P. Schwartz
(74) Attorney, Agent, or Firm—Sanford E. Warren, Jr.; Kenneth T. Emanuelson; Gardere Wynne Sewell LLP

(57) ABSTRACT

A vibration isolator (10) for isolating the vibration of two bodies that are connected together is disclosed. The vibration isolator (10) comprises an inner cylinder (16) and a pair of outer housings (12, 14) concentrically bonded together with elastomer structures (18, 20) to form two chambers (22, 26) that are joined by a tuning port (24). The elastomer structures (18, 20) may serve both as the seals for the chambers (22, 26) and the compliant spring members in the isolator (10). The isolator (10) connects to a vibrating body by a spherical bearing (28). The chambers (22, 26) and tuning port (24) are filled with an inviscid fluid (34) and pressurized to prevent cavitation. In certain embodiments, pressure within the isolator (10) is maintained by a volume compensating device (30) connected to the chambers (22, 26) via a small diameter orifice (36).

36 Claims, 3 Drawing Sheets

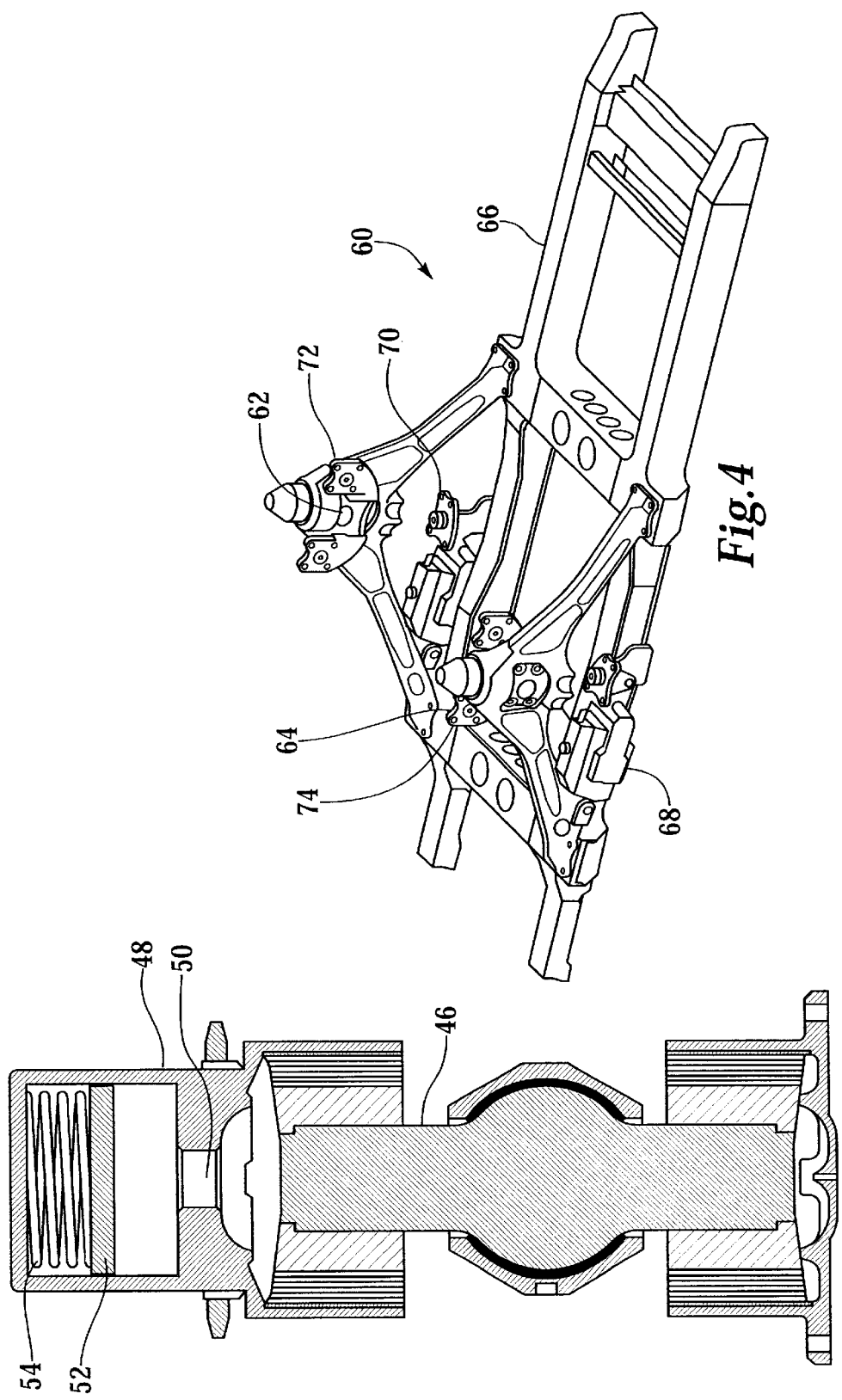

VERTICAL LIQUID INERTIA VIBRATION ISOLATOR

TECHNICAL FIELD OF THE INVENTION

The invention relates in general to the field of vibration isolation and in particular to a vibration isolator incorporating fluid and elastomeric elements to effectively eliminate the transmission of certain vibrational frequencies into structural components.

BACKGROUND OF THE INVENTION

For many years, effort has been directed toward the design of an apparatus for preventing the transmission of vibration from one vibrating body to another body. Such devices are useful in a variety of technical fields in which it is desirable to isolate the vibration of an oscillating or vibrating device, such as an engine, from the remainder of the structure. Typical vibration isolation and attenuation devices ("isolators") employ various combinations of the mechanical system elements to adjust the frequency response characteristics of the overall system to achieve acceptable levels of vibration in the structures of interest in the system. One field in which these isolators find a great deal of use is in aircraft, wherein vibration isolation systems are utilized to isolate the fuselage or other portions of an aircraft from mechanical vibrations which are associated with the propulsion system and which are generated by the engine, transmission, propellers, rotors, or proprotors of the aircraft.

Vibration isolators are distinguishable from dampening devices although dampening devices are often erroneously referred to as isolators. As an illustration, a simple force equation for vibration is set forth as follows:

$$m\ddot{x} + c\dot{x} + kx = F$$

A true vibration isolator utilizes acceleration of a fluid body ($m\ddot{x}$) to cancel the displacement of vibration ($kx$). In contrast, a dampening device is concerned with restricting flow of a fluid or other body and thus velocity ($c\dot{x}$), and does not cancel vibration, but merely absorbs its energy.

Minimization of the length, weight and overall size of the isolation device is an important consideration in the design of an aircraft vibration isolation system. This minimization is particularly important in the design and manufacture of helicopters, which are required to hover against the dead weight of the craft and which are in many ways more constrained in their payload than fixed wing aircraft.

A marked improvement in the field of vibration isolation, particularly as applied to aircraft and helicopters, was disclosed in commonly assigned U.S. Pat. No. 4,236,607, entitled "Vibration Suppression System," issued Dec. 2, 1980 to Halwes, et al., and which is incorporated herein by reference. This patent discloses a vibration isolator in which a dense, low-viscosity fluid is used as the "tuning" mass to counterbalance and cancel oscillating forces transmitted through the isolator. This isolator employs the principle that the acceleration of an oscillating mass is 180 degrees out of phase with its displacement to cancel the transmission of undesirable motion.

Halwes, et al. recognized that the inertial characteristics of a dense, low-viscosity fluid, combined with a hydraulic advantage resulting from a piston arrangement, could harness the out-of-phase acceleration to generate counterbalancing forces to attenuate or cancel vibration.

Although the Halwes device was a significant improvement in the art of vibration isolation, there remains in the field a continuing demand for improvements allowing for a reduction of the weight of such isolators without sacrificing the ability to attenuate or cancel vibration. Additionally, with the continuing emphasis on energy efficiency in transportation, there is a continuing demand for reduction in the weight of vibration isolators. At the same time, customers continue to demand more performance at a lower price, both in vehicles and in replacement parts, giving rise to a need for an isolator that can be manufactured at a lower cost.

SUMMARY OF THE INVENTION

The present invention disclosed herein comprises an improved vibration isolator designed to overcome many of the shortcomings inherent in prior devices. In many embodiments, the vibration isolator is smaller in scale than prior designs, facilitating more versatility with respect to design options. Additionally, many embodiments of the present vibration isolator weigh significantly less than prior designs. At the same time, many embodiments of the present invention can be manufactured at a significantly lower cost than prior isolators.

One embodiment of a vibration isolator of the present invention comprises an inner cylinder and one or more outer cylinders concentrically bonded together with elastomers to form two chambers that are joined by a tuning port. The elastomer serves both as the seal for the chamber and the compliant spring member in the isolator. The chambers and tuning port are filled with an inviscid fluid and pressurized to prevent cavitation.

One embodiment of an isolator according to the present invention incorporates a central elastomeric spherical bearing and two elastomeric tubeform bearings, one at each end. The dimensions of the tubeform bearings can vary according to the demands of a particular application, but the design must be sufficient to minimize elastomer bulging caused by oscillatory pressure in the device.

As the inner cylinder moves within the isolator, the volume of one chamber will increase as the other decreases. This change in volume creates a pressure differential between the chambers and a corresponding flow of the inviscid fluid from one chamber to another. In embodiments having a tuning port through the center of the inner cylinder, the movement of fluid will be in the opposite direction of movement of the inner cylinder. This movement of fluid causes an inertial force to be generated. Within a selected range of frequencies, this inertial force substantially or completely cancels out the elastomeric spring force in the isolator.

In order to stabilize internal fluid pressures, fluid and elastomer thermal expansion is accommodated in certain embodiments through the use of an integral volume compensator. The volume compensator alleviates the accumulation of excessive pressure and the risk of cavitation that would otherwise exist due to pressure changes caused by operation of the isolator across a broad range of temperatures. In certain embodiments, this compensator takes the form of an air spring filled with a gas such as nitrogen. In one embodiment, the air spring does not require a barrier between the gas and the fluid.

Additionally, this embodiment of the isolator communicates fluid pressure to the volume compensator via a small diameter orifice. The size of the orifice is such that the pressure pulses caused by oscillation of the inner cylinder do not pass into the volume compensator in any significant degree. With this design, the orifice acts as a fluid pressure filter, transmitting static pressure changes into the volume compensator while at the same time blocking pressure oscillations.

In one embodiment, damping within the system is minimized through the use of an elastomer having low damping characteristics, through the use of an inviscid fluid within the device, and through the selection of a hydraulic area ratio having a relatively low value.

The fluid used may vary from one embodiment to another, but it is desirable that the fluid have a low viscosity and be noncorrosive. Similarly, the elastomer used for the isolator bearings can vary, but it is desirable that the elastomer have a long fatigue life and exhibit low damping characteristics.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 3 is a cross sectional view of a vibration isolator according to a third embodiment of the present invention;

FIG. 4 is an isometric view of an aircraft structure incorporating one embodiment of the present invention;

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Figure 1:
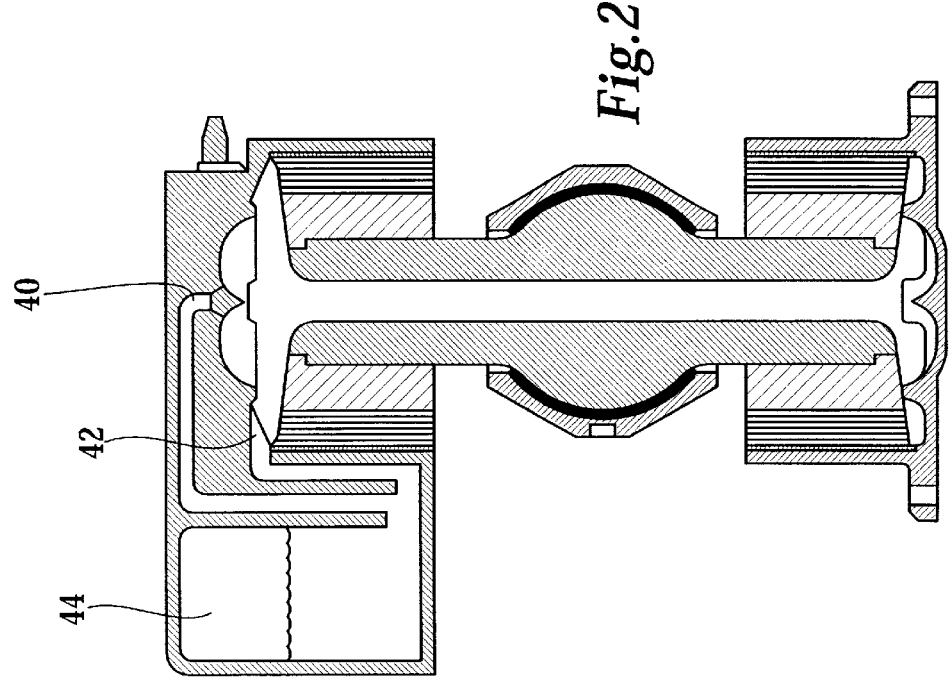
FIG. 1 is a cross sectional view of a vibration isolator according to one embodiment of the present invention.

A vibration isolator according to one embodiment of the present invention is shown in FIG. 1 and generally designated 10. Vibration isolator 10 comprises an upper housing 12 and a lower outer housing 14. In this embodiment, upper housing 12 and lower housing 14 are not directly mechanically connected, but are connected indirectly via the other components of the device.

In addition to upper and lower housings 12 and 14, isolator 10 further comprises an inner cylinder 16 disposed within the volume defined by the concave portions of housings 12 and 14. In operation, inner cylinder 16 translates within this volume in reaction to motion imposed by a vibrating body.

Upper housing 12 is concentrically bonded to inner cylinder 16 by an elastomer tubeform bearing 18. Lower housing 14 is concentrically bonded to inner cylinder 16 by an elastomer tubeform bearing 20. The elastomer tubeform bearings 18 and 20 serve as compliant spring members for the isolator 10. The length of the tubeform bearings can vary according to the demands of a particular application, but the length must be sufficient to minimize elastomer bulging caused by oscillatory pressure in the device.

The concave inner surface of upper housing 12 and the upper surfaces of inner cylinder 16 and tubeform bearing 18 together define an upper fluid chamber 22. Upper fluid chamber 22 is connected to the lower portions of isolator 10 via a tuning port 24 passing through inner cylinder 16. The concave inner surface of lower housing 14 and the lower surfaces of inner cylinder 16 and tubeform bearing 20 together define a lower fluid chamber 26, which is in fluid communication with the lower end of tuning port 24. In addition to serving as compliant spring members for the isolator 10, elastomer tubeform bearings 18 and 20 serve as the fluid seals for fluid chambers 22 and 26.

The fluid chambers 22 and 26 and tuning port 24 are filled with an inviscid fluid 34 and pressurized to prevent cavitation. Isolator 10 incorporates a central elastomeric spherical bearing 28 in addition to the two elastomeric tubeform bearings 18 and 20.

In operation, the upper and lower housings 12 and 14 are mounted to the body to be isolated from vibration. The spherical bearing 28 is connected to the vibrating body. As the inner cylinder 16 moves within the isolator 10, the volume of one of chambers 22 and 26 will increase as the other decreases. This change in volume creates a pressure differential between the chambers 22 and 26 and a corresponding flow of the inviscid fluid 34 from one chamber to another, in the opposite direction of movement of the inner cylinder 16. This movement of fluid 34 causes an inertial force to be generated. Within a selected range of frequencies, this inertial force substantially or completely cancels out the elastomeric spring force in the isolator 10.

In order to stabilize internal fluid pressures, fluid and elastomer thermal expansion is accommodated through the use of an integral volume compensator 30. The volume compensator 30 alleviates the accumulation of excessive pressure and the risk of cavitation that would otherwise exist due to volume changes caused by operation of the isolator across a broad range of temperatures. In the isolator shown in FIG. 1, the compensator 30 takes the form of an air spring 32 filled with a gas such as nitrogen. In this design, the compensator does not require a barrier between the gas 32 and the fluid 34. Empirical data has shown that one embodiment of the present invention exhibits approximately +/−35% change in internal fluid pressure over a temperature range of −45 deg. F to +150 deg. F. Accordingly, it is desirable that the pressure within the volume compensator 30 be set to at least 35% above the vapor pressure of the tuning fluid so as to avoid cavitation. The internal pressure is bounded at the high end by the mechanical stress limits of the isolator materials. The embodiment shown in FIG. 1 incorporates a sight glass 38 for visually determining the level of fluid in the compensator and a gas valve 39 for pressurizing the gas directly. In certain embodiments of the present invention, the inner surfaces of the isolator are shaped so as to allow bubbles to rise to the compensator when the isolator is disposed in its normal orientation.

Isolator 10 communicates fluid pressure to the volume compensator 30 via a small diameter orifice 36. The size of the orifice 36 is such that the pressure pulses caused by oscillation of the inner cylinder 16 do not pass into the volume compensator 30 in any significant degree. With this design, the orifice 36 acts as a fluid pressure filter, transmitting static pressure changes into the volume compensator 30 while at the same time blocking pressure oscillations. The ideal diameter for the orifice 36 will vary with the viscosity of the fluid. One embodiment of the present invention incorporates an orifice having a diameter of approximately 0.050".

Damping within isolator 10 is minimized through the use of elastomer bearings 18 and 20 having low damping characteristics and through the use of an inviscid fluid 34 within the device. Damping is additionally minimized through the use of a tuning port 24 having a relatively large value. A large diameter tuning port 24 reduces damping in the isolator 10 by minimizing the velocity of fluid 34 within the tuning port 24.

The fluid 34 used may vary from one embodiment to another, but it is desirable that the fluid 34 have a low viscosity and be noncorrosive. For example, fluid 34 of isolator 10 may be SPF I manufactured by LORD CORPORATION®. Other embodiments may incorporate mercury or hydraulic fluid having dense particulate matter suspended therein. Additionally, the mass of the fluid may in some embodiments be supplemented by the use of a solid slug disposed in the tuning port 24.

Similarly, the elastomer used for the isolator tubeform bearings 18 and 20 can vary, but it is desirable that the elastomer have a long fatigue life and exhibit low damping characteristics. For example, the elastomer may be LORD SPE X® elastomer manufactured by LORD CORPORATION®.

Figure 2:
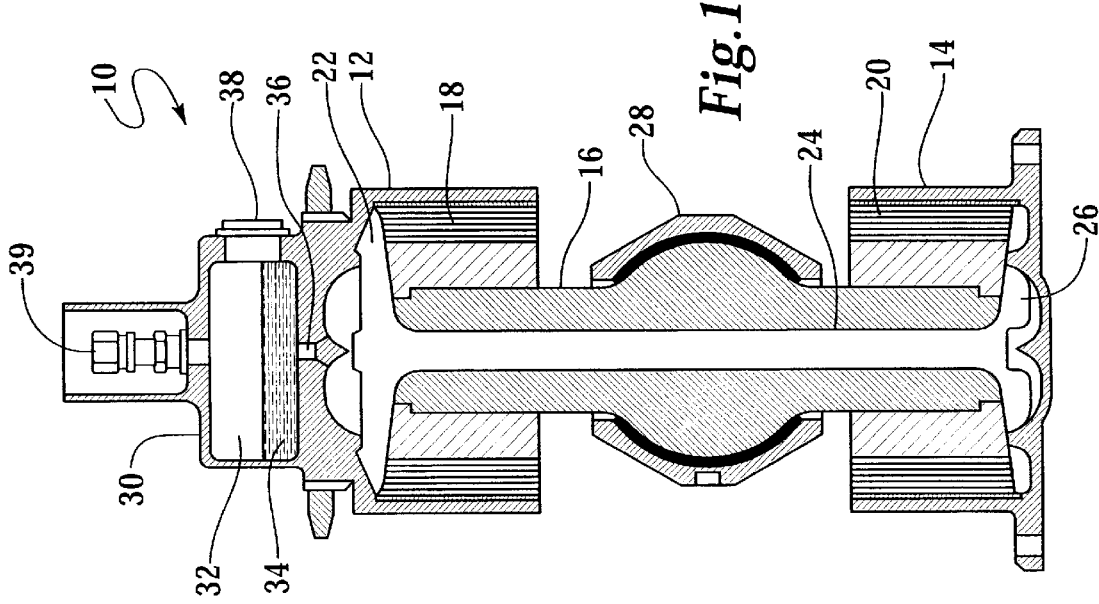
FIG. 2 is a cross sectional view of a vibration isolator according to a second embodiment of the present invention.

FIG. 2 shows an embodiment of the present invention wherein the gas to fluid accumulator 44 is connected to the isolator by means of a first one-way valve 40 and a second one-way valve 42. In this embodiment, the first one-way valve 40 allows bubbles to pass from the fluid reservoir to the accumulator 44 and the second one-way valve 42 allows fluid to pass from the accumulator 44 to the fluid reservoir. With this design, any bubbles formed in the fluid reservoir will float to the top of the fluid reservoir and pass through one-way valve 40 into accumulator 44, where they are collected and added to the gas volume in the accumulator 44. Any volume lost in the form of bubbles from the fluid reservoir to the accumulator 44 through valve 40 is returned to the fluid reservoir through one-way valve 42 in the form of fluid.

FIG. 3 shows an embodiment of the present invention wherein the second chamber 26 of FIG. 1 is replaced with an external fluid chamber 48. In this embodiment, there is no fluid passage passing through inner cylinder 46. This embodiment incorporates an external fluid passage 50 to transmit fluid to the external fluid chamber 48. The volume of chamber 48 is variable according to pressure due to the action of piston 52 and compensating spring 54. The principle of operation of this device is similar to the devices shown in FIGS. 1 and 2.

One embodiment of a vibration isolator of the present invention as installed in a helicopter fuselage substructure is shown in FIG. 4. Helicopter fuselage substructure 60 comprises vibration isolators 62 and 64 mounted to a substructure frame 66 to work in combination with rotor pitch restraints 68 and 70. A vibrating apparatus, in this case a transmission and main rotor pylon assembly (not shown) is mounted between isolators 62 and 64 on mounting yokes 72 and 74. As described above, each of isolators 62 and 64 is rigid in the vertical axis and compliant about the two orthogonal horizontal axes due to the spherical bearing. For a pylon assembly mounted between isolators 62 and 64, the substructure will restrict motion in the vertical, the fore and the aft axes, but will allow the assembly to pitch about the axis running from the spherical bearing in isolator 62 to the spherical bearing in isolator 64. Movement and vibration about this axis is restricted by pitch restraints 68 and 70.

Through incorporation of the novel features and improvements described above, transmission of pylon vibration to the fuselage has been eliminated by 94% at the desired frequencies while at the same time significant improvements have been realized over prior isolation devices in both cost and weight. It has been demonstrated that a vibration isolator constructed according to the present invention can be manufactured for roughly one half the cost of prior devices having a similar level of performance. Additionally, certain embodiments of the present invention weigh less than half as much as prior devices having the same level of performance. These improvements are due largely to the addition of the spherical bearing to the design. Prior devices necessitated the use of flexible rod ends in order to provide the degrees of freedom required for proper operation.

Figure 5:
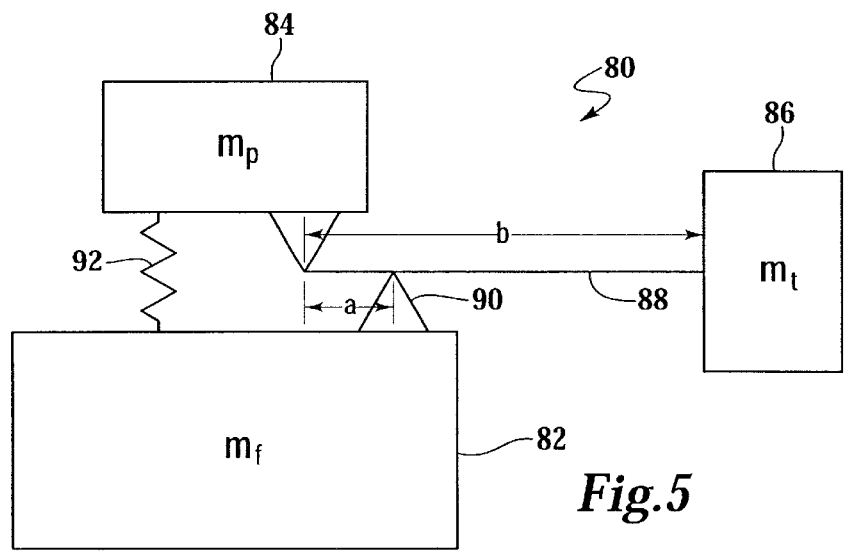
FIG. 5 is a schematic illustration of a spring-mass system representative of the operation of the present invention.

FIG. 5 depicts a schematic illustration of an isolator system 80 according to the present invention. System 80 comprises a fuselage mass 82, a pylon mass 84, and a tuning mass 86 connected by a lever arm 88 and a spring 92. Pylon mass 84 moves in response to an imposed oscillation and must be connected to fuselage mass 82, but it is desirable to isolate fuselage mass 82 from the vibration of pylon mass 84.

Tuning mass 86 and spring 92 have been added to the system to provide isolation. The displacement of spring 92 is a direct function of the difference in displacement between fuselage mass 82 and pylon mass 84. The displacement of tuning mass 86 is a function of the displacement of fuselage mass 82, the displacement of pylon mass 84, the length of lever arm 88, and the position of fulcrum 90. It can be seen in FIG. 3 that a small displacement of pylon mass 84 will result in a relatively large displacement of tuning mass 86.

In isolator 10 of FIG. 1, tuning mass 86 takes the form of the inviscid fluid 34 filling the isolator 10, which is moved by actuation of the inner cylinder 16. The function represented by lever arm 88 is embodied in isolator 10 in the form of the difference between the area of the ends of cylinder 16 and the area of the tuning port 24. It can be seen in FIG. 1 that, owing to the relatively large cross-sectional area of the inner cylinder 16 as compared to tuning port 24, a small displacement of inner cylinder 16 will result in the movement of a relatively large volume of tuning fluid. The function of the spring 92 takes the form of elastomeric tubeform bearings 18 and 20 in isolator 10.

The equations of motion for a vibration isolator according to the present invention installed in an aircraft fuselage and connected to a vibrating pylon assembly can be described as follows:

$$\begin{vmatrix} m_p & 0 & 0 \\ 0 & m_f & 0 \\ 0 & 0 & m_t \end{vmatrix} \cdot \begin{pmatrix} \ddot{u}_p \\ \ddot{u}_f \\ \ddot{u}_t \end{pmatrix} + \begin{vmatrix} k_r & -k_r & 0 \\ -k & k_r & 0 \\ 0 & 0 & 0 \end{vmatrix} \cdot \begin{pmatrix} u_p \\ u_f \\ u_t \end{pmatrix} = \begin{pmatrix} F_p \\ 0 \\ 0 \end{pmatrix} \quad (1)$$

where $m_p$=the pylon mass $m_f$=the fuselage mass $m_t$=the isolator tuning mass $k_r$=the spring rate of the elastomer in the isolator $F_p$=the excitation force acting on the pylon The isolator tuning mass n, is defined as follows:

$$m_t = AL\rho \quad (2)$$

where A=the tuning port cross-sectional area

L=the tuning port length

ρ=the density of the isolator tuning fluid

Owing to the fact that the inner cylinder 16 is mounted to the pylon by the spherical bearing 28 and the housings 12 and 14 of the isolator 10 are mounted to the aircraft fuselage, the fluid motion in the tuning port 24 is a function of the motion of both the pylon and the fuselage. The motion of the fluid tuning mass $u_t$ relates to the motion of the pylon $u_p$ and fuselage $u_f$ according to the following kinematic constraint equation:

$$u_t = (R)u_f - (R-1)u_p \quad (3)$$

This constraint equation can be used to reduce the three degree of freedom (3-DOF) system to a two degree of freedom (2-DOF) system through the formation of a transformation matrix, G:

$$[u]_{3DOF} = [G][u]_{2DOF} \quad (4)$$

In expanded form:

$$\begin{pmatrix} u_p \\ u_f \\ u_t \end{pmatrix} = \begin{bmatrix} 1 & 0 \\ 0 & 1 \\ 1-R & R \end{bmatrix} \cdot \begin{pmatrix} u_p \\ u_f \end{pmatrix} \quad (5)$$

Pre- and post-multiplying the mass, stiffness, and force matrices shown above in equation (1) results in the following equation of motion for the reduced set:

$$\begin{bmatrix} m_p + (R-1)^2 m_t & -R(R-1)m_t \\ -R(R-1)m_t & m_f + r^2 m_t \end{bmatrix} \cdot \begin{pmatrix} \ddot{u}_p \\ \ddot{u}_f \end{pmatrix} + \begin{bmatrix} k_r & -k_r \\ -k_r & k_r \end{bmatrix} \cdot \begin{pmatrix} u_p \\ u_f \end{pmatrix} = \begin{pmatrix} F_p \\ 0 \end{pmatrix} \quad (6)$$

Solving, then, for the eigenvalues in the above equation gives the natural frequency $f_n$ of the pylon in the vertical axis:

$$f_n = \frac{1}{2\pi} \sqrt{\frac{k_r(m_p + m_f + m_t)}{m_p m_f + (R^2) m_t m_p + (R-1)^2 m_t m_f}} \quad (7)$$

The inertial effect of the fluid tuning mass $m_t$ is multiplied by the square of the area ratio R. In the denominator of equation (7), the sum of the last two products, $$(R)^2 m_t m_p + (R-1)^2 m_t m_f \quad (8)$$

may be approximately ⅓ of the first product, $m_p m_f$. The presence of the mass of the fluid reduces the natural frequency of the pylon along the vertical axis. For example, the fluid may reduce this natural frequency from approximately 19.9 Hz to approximately 15.5 Hz.

The frequency of isolation $f_i$ is found by setting the fuselage motion equal to zero ($u_f = u_t = 0$) and solving the lower homogenous equation in the reduced set of equations of motion. This solution is expressed as:

$$f_i = \frac{1}{2\pi} \sqrt{\frac{k_r}{(R-1)(R)m_i}} \quad (9)$$

It can be seen from this equation that the isolation frequency is independent of the inertia of both the fuselage and the pylon.

The system stiffness K* can be expressed as a function of frequency f by grounding the fuselage side ($u_f = 0$) and solving for the dynamic response:
where $f_{ng}$ = the grounded isolator natural frequency
$\zeta$ = the system damping $$K^*(f) = \left(\frac{F_p}{u_p}\right) \frac{1}{\sqrt{\left(\left[1 - \left(\frac{f}{f_{ng}}\right)^2\right]\right)^2 + \left(\left[2\zeta\left(\frac{f}{f_{ng}}\right)\right]\right)^2}} \quad (10)$$

Figure 6:
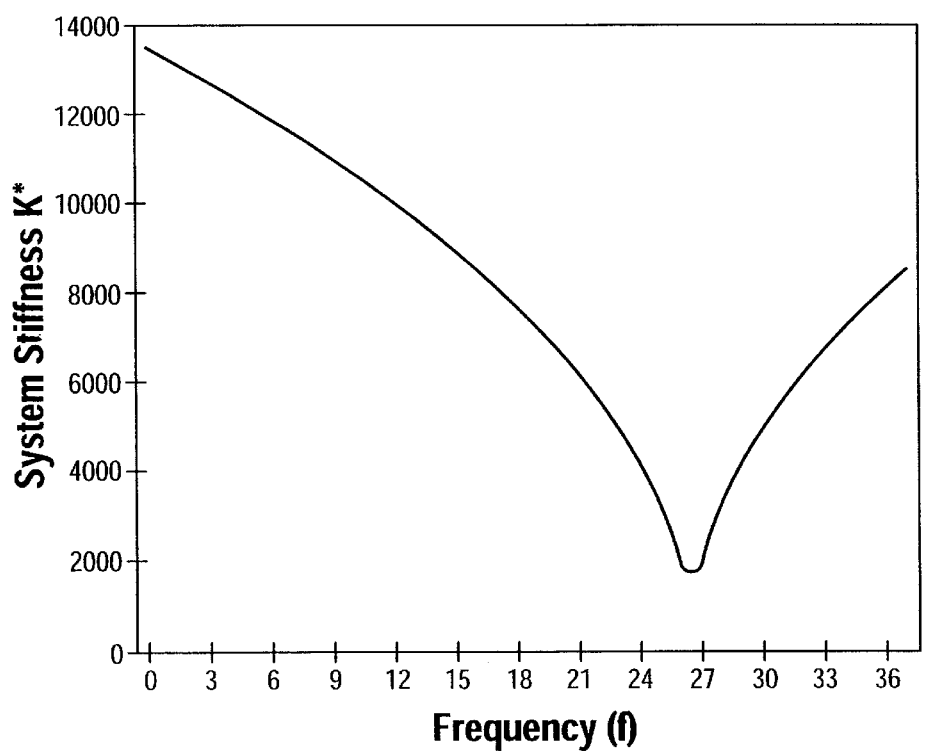
FIG. 6 is a frequency response plot for one embodiment of the present invention.

In this expression, the grounded isolator natural frequency $f_{ng}$ can be solved by eliminating the fuselage degree of freedom in the reduced equation of motion (6) and reducing the equation of motion to a single degree of freedom. The system damping, represented by $\zeta$ in the above equation, may be minimized as the isolator stiffness varies from approximately 13,500 lb./in. at 0 Hz to approximately 1,800 lb./in. at 26.3 Hz. A graph of isolator stiffness over a range of frequencies is shown in FIG. 6.

Through incorporation of the novel features and improvements described above, transmission of pylon vibration to the fuselage has been eliminated by 94% at the desired frequencies while at the same time significant improvements have been realized over prior isolation devices in both cost and weight. It has been demonstrated that a vibration isolator constructed according to the present invention can be manufactured for roughly one half the cost of prior devices having a similar level of performance. Additionally, that same embodiment weighs less than half as much as the prior devices and requires less space.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

What is claimed is:

1. A vibration isolator for connecting a first body and a second body, comprising:
   a housing having an inner surface defining a fluid volume;
   a tuning fluid disposed in the fluid volume;
   an inner cylinder disposed in the fluid volume and having a surface disposed to substantially segregate a portion of the fluid volume, the segregated portion defining a first chamber within the fluid volume;
   a second chamber having a variable volume;
   a passage connecting the first chamber to the second chamber and permitting fluid flow from the first chamber to the second chamber wherein the first and second chambers and the passage define a fluid reservoir;
   a spherical bearing adapted to connect the vibration isolator to the first body; and
   a gas-to-fluid accumulator having fluid communication with the uppermost portion of the fluid reservoir.

2. The isolator of claim 1 wherein the inner surfaces of the isolator are shaped so as to allow bubbles to rise to the top of the isolator when the isolator is disposed in its normal orientation.

3. The isolator of claim 1 wherein the gas to fluid accumulator is connected to the fluid volume through a small diameter orifice.

4. The isolator of claim 1 wherein the gas to fluid accumulator is connected to the fluid reservoir by means of a first and second one-way valve wherein the first one-way valve allows fluid to pass from the fluid reservoir to the accumulator and the second one-way valve allows fluid to pass from the accumulator to the fluid reservoir.

5. The isolator of claim 1 wherein the gas to fluid accumulator further comprises a gas valve for pressurizing the gas directly.

6. The isolator of claim 1 wherein the gas to fluid accumulator further comprises a sight glass for visually determining the level of fluid in the isolator.

7. The isolator of claim 1 wherein the gas to fluid accumulator is disposed at the top end of the isolator.

8. The isolator of claim 1 wherein the gas to fluid accumulator is designed to provide direct communication between the gas and fluid.

9. A vibration isolator for connecting two bodies while isolating one body from vibration in the other body comprising:
   an outer cylinder, adapted to be connected to one of the bodies and having an elongate inner volume;
   an inner cylinder movably disposed within the inner volume, the inner cylinder and the inner volume defining first and second chambers at either end of the inner cylinder;
   a tuning port connecting the first and second chambers wherein the first and second chambers and the tuning port define a fluid reservoir;
   a spring connecting the inner cylinder to the outer cylinder;
   a tuning mass substantially filling the first and second chambers and the tuning port;
   a spherical bearing mounted to the inner cylinder and adapted to be connected to a second body; and
   a gas to fluid accumulator connected to the uppermost portion of the fluid reservoir by means of a first and second one-way valve wherein the first one-way valve allows fluid to pass from the fluid reservoir to the accumulator and the second one-way valve allows fluid to pass from the accumulator to the fluid reservoir.

10. The isolator of claim 9 wherein the inner surfaces of the isolator are shaped so as to allow bubbles to rise when the isolator is disposed in its normal orientation.

11. The isolator of claim 9 wherein the gas to fluid accumulator is connected to the fluid reservoir through a small diameter orifice.

12. The isolator of claim 9 wherein the gas to fluid accumulator further comprises a gas valve for pressurizing the gas directly.

13. The isolator of claim 9 wherein the gas to fluid accumulator further comprises a sight glass for visually determining the level of fluid in the isolator.

14. The isolator of claim 9 wherein the gas to fluid accumulator is designed to provide direct communication between the gas and fluid.

15. The isolator of claim 9 wherein the gas to fluid accumulator is disposed at the top end of the isolator.

16. The isolator of claim 9 wherein the tuning mass is a fluid characterized by low viscosity.

17. The isolator of claim 9 further comprising a raised feature at each end of the inner surface of the outer cylinder disposed so as to limit the range of travel of the inner cylinder.

18. The isolator of claim 9 further comprising a feature disposed so as to limit the range of pitch of the spherical bearing.

19. The isolator of claim 9 wherein the spring is constructed of a deformable diaphragm.

20. The isolator of claim 9 wherein the spring comprises a first axially-compliant bearing connecting one end of the inner cylinder to the outer cylinder and a second axially-compliant bearing connecting the remaining end of the inner cylinder to the outer cylinder.

21. The isolator of claim 20 wherein the axially-compliant bearings are constructed of an elastomer exhibiting a long fatigue life and low damping characteristics.

22. An apparatus for reducing vibration transfer between a first and a second body, comprising:
   an upper housing, having a generally concave shape, adapted to be connected to the first body;
   a lower housing, having a generally concave shape, adapted to be connected to the first body, the lower housing disposed adjacent to the upper housing and oriented such that the concave portion of the lower housing faces the concave portion of the upper housing, said upper and lower housings together defining an inner volume therebetween;
   an inner cylinder movably disposed within the inner volume, the inner cylinder and the inner volume defining first and second chambers at either end of the inner cylinder;
   a spherical bearing adapted to connect the inner cylinder to the second body;
   a tuning port passing through the inner cylinder and connecting the first and second chambers, wherein the first and second chambers and the tuning port define a fluid reservoir;
   an upper tubeform bearing connecting the inner cylinder to the upper housing and sealing the gap therebetween;
   a lower tubeform bearing connecting the inner cylinder to the lower housing and sealing the gap therebetween;
   a tuning mass substantially filling the first and second chambers and the tuning port; and
   a volume compensator, communicated to the uppermost portion of the fluid reservoir via an orifice.

23. The apparatus of claim 22 wherein the tubeform bearings are elastomeric tubeform bearings made of an elastomer exhibiting a long fatigue life and low damping characteristics.

24. The apparatus of claim 22 wherein the tubeform bearings are separate from one another and are not directly connected.

25. The apparatus of claim 22 wherein the tuning mass comprises a fluid characterized by low viscosity.

26. The apparatus of claim 22 wherein the spherical bearing is elastomeric.

27. The apparatus of claim 22 wherein the spherical bearing is teflon.

28. The apparatus of claim 22 wherein said tuning mass includes a solid slug slidably disposed along the passage, with liquid filling the remainder of the passage and both chambers.

29. The apparatus of claim 22 wherein the inner surfaces of the isolator are shaped so as to allow bubbles to rise to the top when the isolator is disposed in its normal orientation.

30. The apparatus of claim 22 wherein the volume compensator further comprises a gas valve for pressurizing the gas directly.

31. The apparatus of claim 22 wherein the volume compensator further comprises a sight glass for visually determining the level of fluid in the isolator.

32. The apparatus of claim 22 wherein the volume compensator is disposed at the top end of the isolator.

33. The apparatus of claim 22 wherein the volume compensator is designed to provide direct communication between the gas and fluid.

34. The apparatus of claim 22 further comprising a raised feature disposed on the inner surface of each of the upper and lower housings in such a manner as to limit the range of travel of the inner cylinder.

35. The apparatus of claim 22 further comprising a feature disposed so as to limit the range of pitch of the spherical bearing.

36. A method of manufacturing a vibration isolator comprising a housing having an inner surface, a piston having two ends, and two tubeform bearings, the method comprising the steps of:

providing a housing having an inner surface and a volume compensator at one end thereof;

selecting a first tubeform bearing from a set of known good bearings;

selecting a second tubeform bearing from a set of known good bearings;

bonding the first tubeform bearing between a first end of the piston and the inner surface of the housing; and bonding the second tubeform bearing between a second end of the piston and the inner surface of the housing.

* * * * *